April 12, 1938.  J. S. TROYER  2,113,999
HARVESTER THRESHER
Filed Dec. 16, 1935  4 Sheets—Sheet 1

Inventor
J. S. Troyer
By C. A. Snow & Co.
Attorney.

April 12, 1938.  J. S. TROYER  2,113,999
HARVESTER THRESHER
Filed Dec. 16, 1935  4 Sheets-Sheet 4
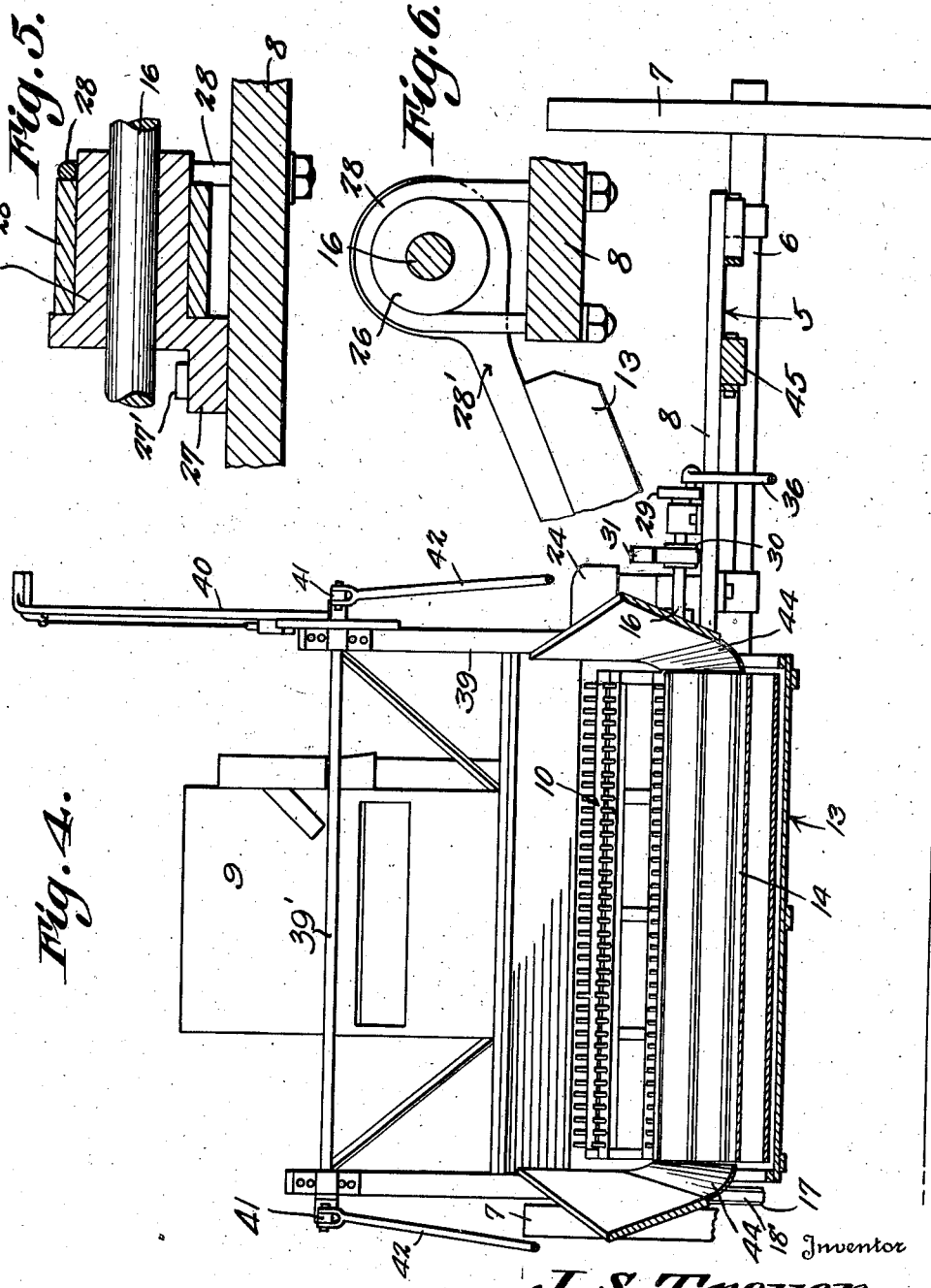

Patented Apr. 12, 1938

2,113,999

UNITED STATES PATENT OFFICE 2,113,999

HARVESTER THRESHER

John S. Troyer, Moyock, N. C.

Application December 16, 1935, Serial No. 54,766

1 Claim. (Cl. 56—21)

REISSUED
APR 9 - 1940

This invention relates to agricultural machines, and in particular to agricultural machines known as combined harvesting and threshing machines.

The primary object of the invention is to provide a machine of this character which will embody all of the characteristics and advantages of the usual large and expensive harvesters and threshers now in common use.

An important object of the invention is to provide a combined harvester thresher which may be operated and controlled by one man, thereby reducing the cost of operation to a minimum.

A still further object of the invention is to pivotally mount the platform of the harvester so that the platform may be readily and easily tilted to adjust the cutter bar operating at the forward end of the platform, with respect to the ground surface and crop being harvested.

Another important object of the invention is to provide agricultural machines of this type wherein the harvester platform is mounted in direct alignment with the threshing cylinder and in front of the threshing cylinder, thereby eliminating the usual elevating canvas feeder and other complicated machinery commonly employed in harvester and thresher machines now in use.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 4 is a sectional view taken on line 4—4 of Figure 2.

Figure 5 is a sectional view through the bearing and shaft that provide the support for the harvesting platform.

Figure 6 is a sectional view through the harvester platform bearing taken at right angles to Figure 5.

Figure 1:
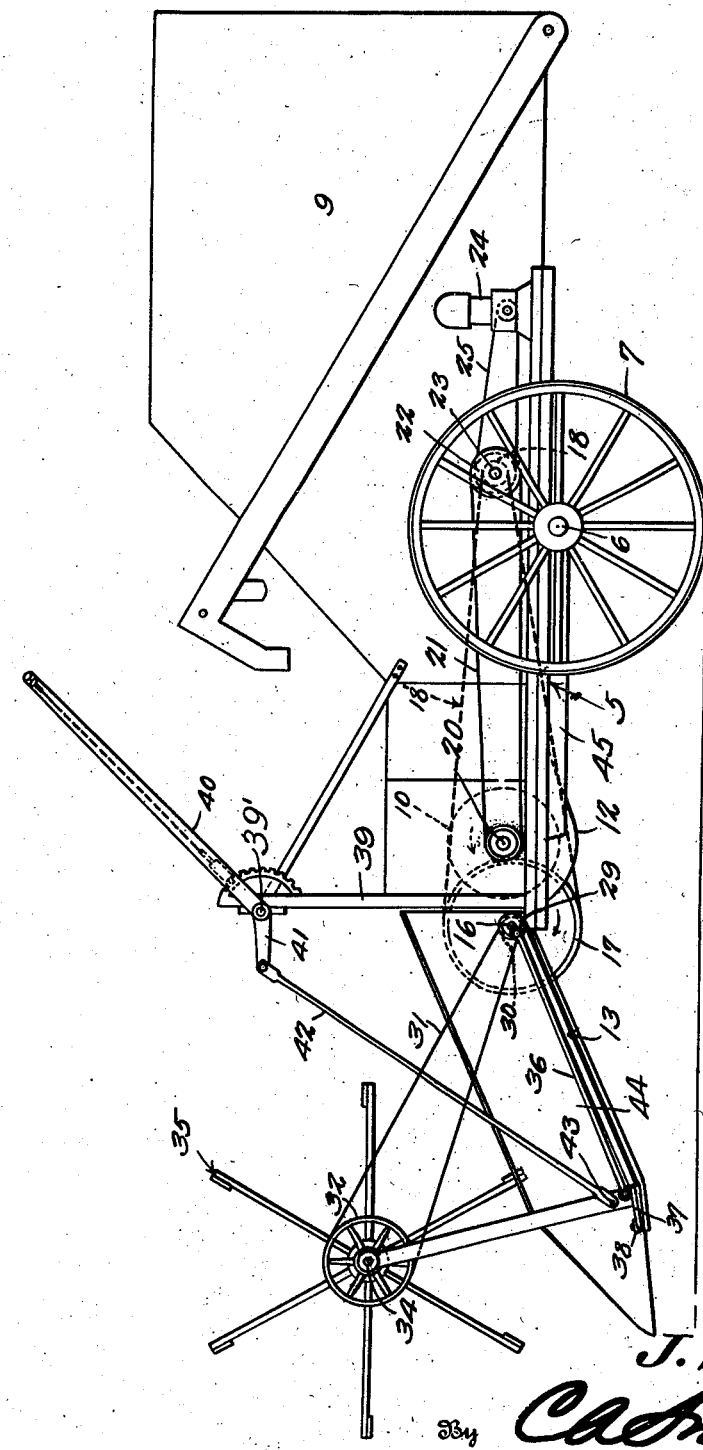
Figure 1 is a side elevational view of a machine constructed in accordance with the invention.
Figure 2:
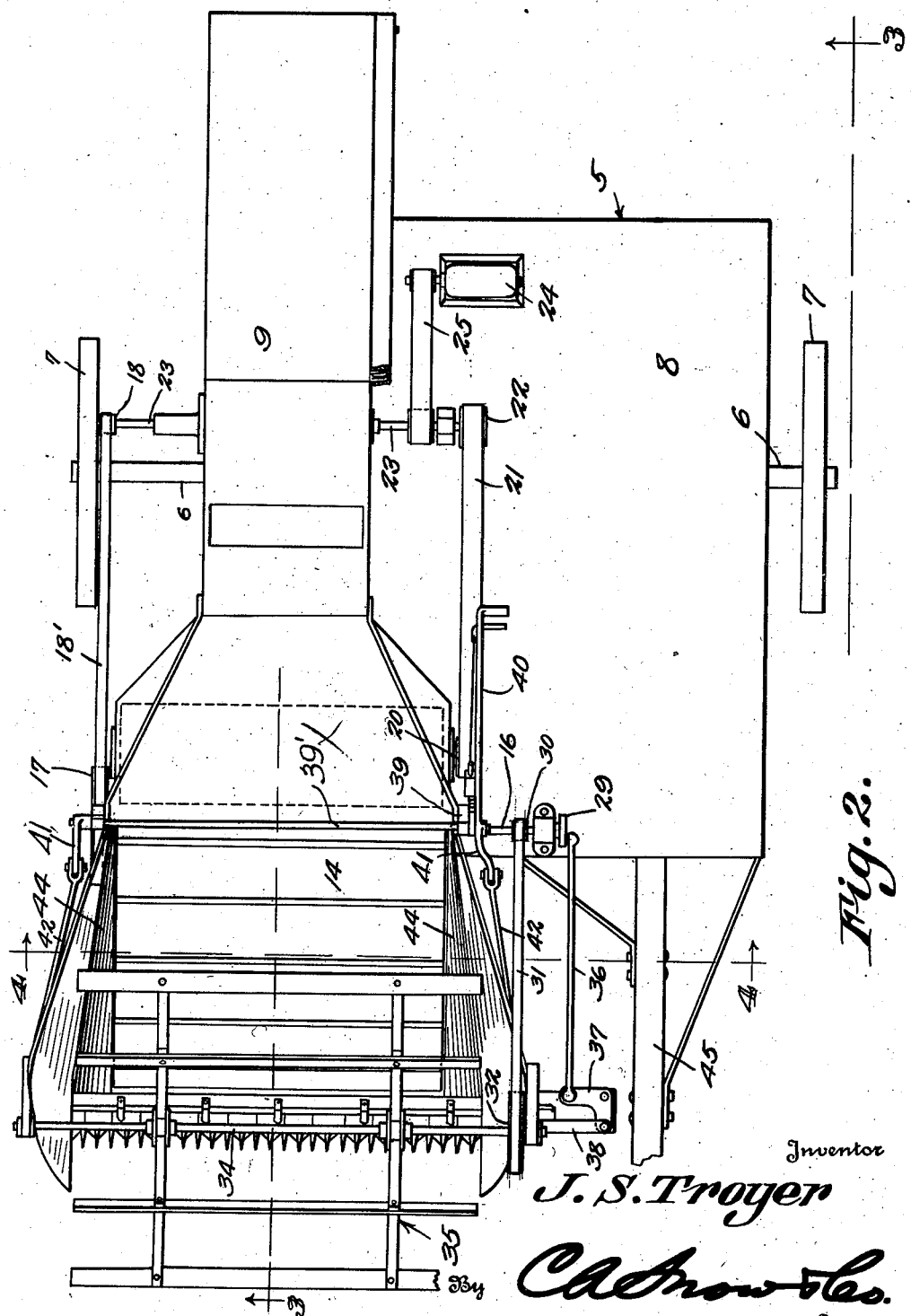
Figure 2 is a plan view thereof.

Referring to the drawings in detail:

The frame of the machine is indicated generally by the reference character 5, and is supported on the axle 6 on which the wheels 7 are mounted.

Mounted on the frame of the machine is a platform 8 which provides a support for the body 9 in which the threshing cylinder 10 and usual shaker screens of the threshing machine, are mounted.

Figure 3:
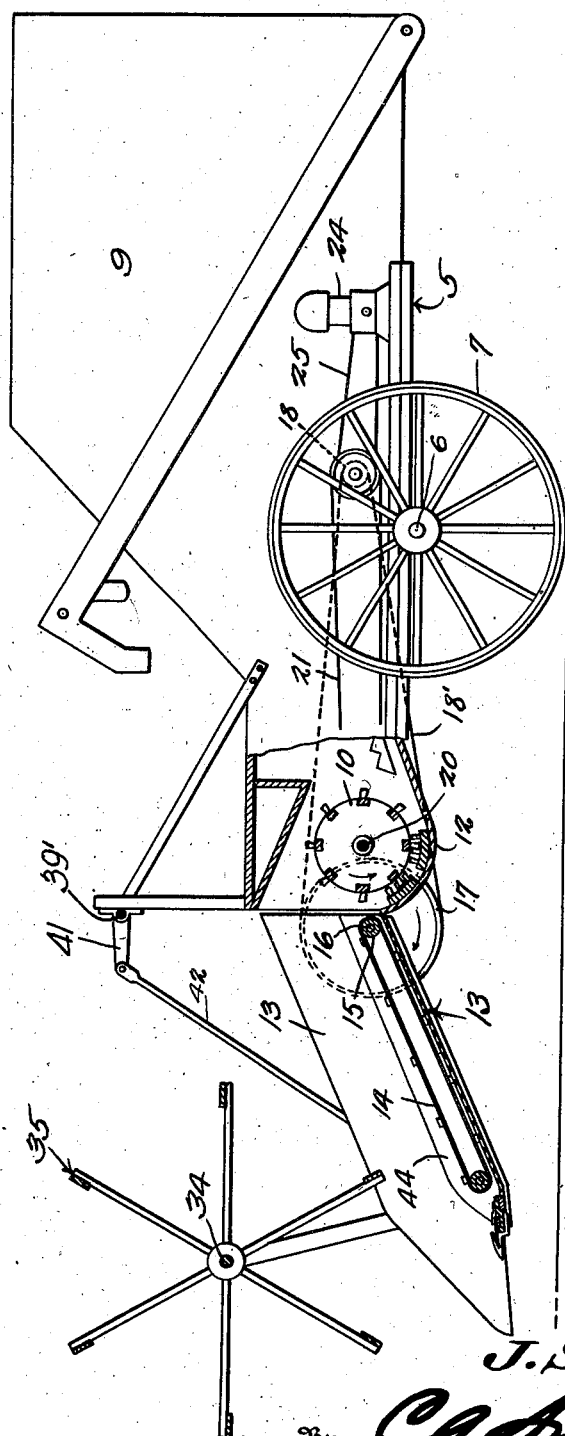
Figure 3 is a sectional view taken on line 3—3 of Figure 2.

As clearly shown by Figure 3 of the drawings, the front end of the body portion 9 is curved downwardly and upwardly as at 12, the front edge being disposed adjacent to the movable harvester platform 13 on which the endless conveyor belt 14 is mounted. This belt 14 operates over the roller 15 mounted on the shaft 16 which extends transversely of the harvester platform 13 and carries the substantially large pulley 17 at one end thereof. The reference character 18' designates a belt which operates over the pulley 18 mounted on one end of the shaft 23. This belt 18' also operates over the pulley 17 and transmits movement of the shaft 23 to the shaft 16 and endless conveyor belt 14.

Mounted on the opposite end of the shaft 20 is a pulley over which the belt 21 operates, the belt 21 also operating over the pulley 22, secured on the shaft 23, which in turn is operated by means of the motor 24 and belt 25.

The shaft 16 is mounted in bearings, indicated by the reference character 26, disposed near opposite sides of the platform. Each of these bearings comprises an elongated body portion and an offset supporting section 27, the supporting sections being formed with bolt openings to receive the bolts 27'. Thus it will be seen that due to this construction the elongated body portions are disposed in spaced relation with the platform 8, providing clearances for the metallic straps 28' that are connected with the harvesting platform 13, thereby providing not only a bearing for supporting the shaft 16, but at the same time secures platform 13 on platform 8. U-bolts 28 embrace portions of the bearings and extend through openings in the platform 8, the U-bolts contacting with the metallic straps to prevent movement of the metallic straps longitudinally of the bearings 26.

Mounted on the shaft 16 is a pulley 30 over which the belt 31 operates, the belt 31 also operating over the substantially large pulley 32 mounted on one end of the reel shaft 34 whereby the reel 35, mounted on the shaft 34 and operating at the front end of the machine, is rotated to move the grain being cut into the cutter bar of the machine.

The cutter bar is operated by means of the pitman 36, which receives its motion through the eccentric 29 mounted on one end of shaft 16, the pitman being connected with the bell-crank lever 37 which in turn connects with the arm 38, extending from one end of the cutter bar.

Thus it will be seen that due to the construction of the bearing 26, the harvester platform and cutter bar may be raised and lowered at the will of the operator while the machine is in motion. Rising from the frame of the machine are posts 39 which posts provide a support for the shaft 39' having levers 41 mounted on the ends thereof, that are connected with the links 42 that in turn connect with the harvester platform at 43. The lever 40 is secured to the shaft 39', near one end thereof for operating the shaft 39'. As the lever 40 is operated, the harvester platform is raised and lowered and may be adjusted with respect to the ground surface, for the efficient operation of the machine.

Curved guards 44 are provided at each side of the platform and act to direct the grain inwardly toward the endless conveyor 14.

The tractor hitch is indicated by the reference character 45 and affords means whereby a suitable tractor or other propelling means may be hitched to the machine.

While I have shown and described the motor 24 as the power device of the machine it is to be understood that power may be transmitted to the machinery by a suitable belt or chain passing over the power wheel of the tractor to which the machine is connected.

Having thus described the invention, what is claimed is:

In a combined harvester and thresher, a wheel-supported frame, a main platform mounted on the frame, a harvester platform pivotally mounted at the front end of the main frame, the harvester platform being of a width equal to the width of the main platform, curved guards arising from the harvester platform at the side edges thereof, said guards adapted to deliver material inwardly towards the center of the harvester platform, a cutter bar operating at the forward end of the harvester platform, an endless conveyor operating at the rear of the cutter bar and adapted to deliver material rearwardly and deposit the material on the main platform, a reel operating at the forward end of the harvester platform for moving material into the cutter bar, and means for raising and lowering the harvester platform regulating the position of the harvester platform with respect to the ground surface over which the machine is moving.

JOHN S. TROYER.